Patented Sept. 13, 1949

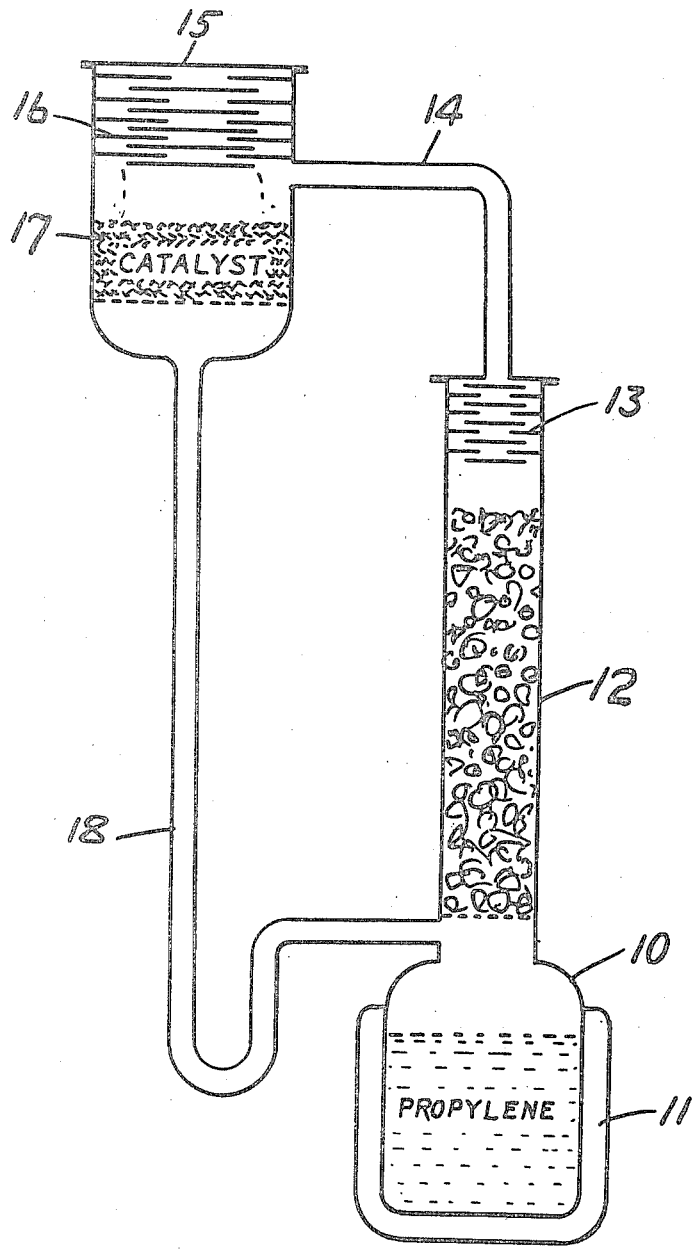

2,482,008

UNITED STATES PATENT OFFICE 2,482,008

PROCESS FOR POLYMERIZATION OF PROPYLENE

Eugene V. Kleber, Wyandotte, Mich., assignor to Sharples Chemicals Inc., Philadelphia, Pa., a corporation of Delaware Application September 2, 1944, Serial No. 552,493

1 Claim. (Cl. 260—683.15)

The present invention pertains to dimerization of open chain olefinic hydrocarbons containing between three and six carbon atoms. A feature of the invention consists in the fact that it provides a method by which the starting material may be converted to the desired dimer in very high yield.

The invention was perfected in connection with experimental work involving research to convert propylene into a mixture of hexenes, and it will accordingly be described with reference to such a process, with the understanding that analogous procedure may be adopted in conversion of other olefins within the range indicated to their dimers within the scope of the invention, as defined in the attached claims.

A number of problems are encountered in attempts to dimerize propylene which are characteristic of the problems encountered in attempted dimerization of the other starting materials or mixtures of the invention. Catalysts which cause dimerization also cause further condensation of the dimer with the original monomer to form higher polymers. The dimers tend to depolymerize in the presence of the catalysts to form monomers, with the result that there is a tendency to establish an equilibrium at which the mixture contains monomer, dimer and higher polymers. The present invention is particularly advantageous in that it provides a process by which dimerization can be effected with formation of only a small quantity of higher polymers and by which, by continued practice of the dimerization process, practically all of the original starting material can be converted into the desired dimer.

Starting with propylene, for example, the main body of the material under treatment is maintained in liquid phase under super-atmospheric pressure in a still. Heat is applied to the liquid to effect vaporization of a part thereof, and the vaporized portion is condensed to re-form the liquid. This liquid then flows by gravity through a chamber containing a bed of solid polymerization catalyst and returns through this bed of catalyst to the body of liquid olefin to which heat is being applied to effect continued vaporization.

In the practice of the invention as described above, the volume of the bed of catalyst is maintained sufficiently small with respect to the quantity of liquid being percolated through it after condensation to provide a very short period of contact between the percolating liquid and the solid body of catalyst. A contact time of the order of magnitude of between one and twenty seconds will usually be sufficient. In any case, the process is practiced in such a manner that the length of time of contact between the catalyst and the olefin under treatment is insufficient to convert more than 10% of the olefin to the corresponding dimer during any single pass through the catalyst bed.

By maintaining a relatively short period of contact between any particular portion of the propylene under treatment and the catalyst during any given pass through the catalyst, the formation of products of higher degree of polymerization than the dimer is almost completely avoided. Thus, by operating under super-atmospheric pressure and effecting contact of liquid phase olefin with the catalyst for a time long enough to convert a substantial part of the olefin into the corresponding dimer but sufficiently short substantially to avoid higher degrees of polymerization, and by re-boiling unpolymerized propylene to subject it repeatedly to contact with the polymerization catalyst, the volume of propylene under treatment may be converted very largely to the desired dimer. In view of the higher boiling point of the dimer, the process may be conducted in such a manner as to avoid contact of this dimer with the catalyst after the dimer has once been formed and returned to the body of liquid under treatment.

The process may be more clearly understood by reference to the attached flow sheet, in which, the single figure illustrates in schematic form an apparatus designed for production of hexylene from propylene.

Referring to the flow sheet by reference characters, the apparatus comprises a still 10 in which a body of propylene under treatment may be maintained under super-atmospheric pressure in the liquid phase. The still is surrounded by a jacket 11, through which steam or other heat exchange fluid may be applied to effect boiling of the propylene. Upon application of heat to the still 10, propylene vapors ascend to the packed column 12 which may contain a dephlegmator 13. The ascending vapors pass through conduit 14 at the top of the column into condenser 15 which may contain a dephlegmator 16 which causes condensation of the propylene vapors. The condensed liquid descends to a bed of catalyst 17, which may be any solid catalyst of a type capable of inducing polymerization reactions to take place. After a brief passage through the catalyst bed 17, the mixture of dimer and unpolymerized monomer descends through conduit 18 and is thus returned to the body of liquid in the still 10.

It will be seen from the above description that the propylene of the mixture returned through conduit 18 to the still 10 may continue to be passed indefinitely through the steps of the cycle described above, and thus continually subjected to contact with the polymerization catalyst until substantially all of this propylene has been dimerized. With respect to the hexylene formed in any given pass, on the other hand, this material remains in the still 10, or is returned promptly to that still by the condensing effect of the packing in column 12 or by the plates 13, in case it is again vaporized. We thus have repeated contact of propylene with the catalyst, until the propylene is ultimately dimerized, but the process is practiced in such a manner as to prevent further contact of the formed hexylene with the catalyst, and further condensation of this hexylene with hexylene or propylene in contact with the catalyst is prevented after the hexylene has once been returned to the still.

Best results in practice of the invention have been attained by heating the reaction mixture so vigorously as to create a pressure condition involving pressures very close to the critical pressure of the olefin material to be converted to the dimer. This entails, of course, use of temperatures which are sufficiently close to the critical temperatures to cause continued ebullition of the olefin monomer under the pressures attained. In general, best results have been attained in operations in which temperatures within 10° C. of the critical temperature of the olefin under treatment are used. Thus, in dimerization of the propylene, it is best to operate between a temperature of 81.4° C. and 91.4° C., and the dimerization of other olefins between 3 and 6 carbon atoms can also best be attained at temperatures within 10° C. of the critical temperature. When pentene-2 is treated, the preferred temperature is between 192 and 202° C. although lower temperatures may be used.

While I have chosen to describe the invention specifically with reference to treatment of propylene, and the invention was originally conceived with reference to dimerization of this material, it may also be practiced in treatment of the various other olefins within the carbon content limits discussed above. Thus, the various butylenes, amylenes and hexylenes, including isomeric mixtures of these materials, may be treated in a manner similar to that described above with reference to propylene to produce the corresponding dimers.

The only physical limitations on the catalysts to be used in practice of the invention are that they must be solids and insoluble to any substantial extent in the liquids being percolated through them. This last-mentioned qualification results from the fact that, if the catalyst were to be dissolved to a substantial extent in the liquid under treatment, it would gradually be washed down into the still containing the liquid material under treatment. The presence of the catalyst in this still together with the mixture of dimers and monomers would ultimately result in further polymerization to defeat the object of the invention.

It is impossible to specify with exactness general instructions either as to the contact time or temperature by which best conversions and yields can be attained in practice of the invention, for these factors depend upon the particular catalyst being used and the particular olefin being dimerized. With less active catalysts, the apparatus should be arranged to provide a longer contact time at any given temperature, or a higher temperature should be employed, as will be obvious to any skilled chemist. Excellent results have been attained in practice of the invention by use of active clay catalysts containing a high proportion of aluminum silicate (e. g. tonsil, Florida earth, Retrol, Filtrol, etc. clays), but the invention is by no means restricted to use of such catalysts, since any one of the many solid polymerization catalysts known to the art and having the above-discussed characteristics may be employed. Thus, for example, a suitably supported Friedel-Crafts catalyst may be used to catalyze the reaction.

Example I

Twenty-eight pounds of propylene were charged into an apparatus constructed as illustrated in the attached flow sheet. Steam was applied to the jacket 11 and the propylene was vaporized into the column 12, which was packed with Raschig rings. A small reflux was maintained in the dephlegmator 13 to prevent polymer from rising through the column. Pure propylene passed through pipe 14 and condensed on the dephlegmator 16 and fell through the catalyst 17 at the rate of 183 pounds per hour. The catalyst consisted of one liter of Kleenflo granular activated clay. The steam pressure in the jacket 11 and the cooling water rates in the dephlegmators 13 and 16 were so adjusted that the pressure was maintained at 570 pounds per square inch (gauge). At this pressure the temperature of the propylene entering the catalyst chamber was 84° C. After 11.5 hours of such operation, the polymerized material in the still pot 10 was withdrawn. The polymer was found to contain 4.85 pounds of dimer and 3.20 pounds of higher polymer. Fourteen percent by volume of the dimer was found to be tetramethylethylene.

Example II

Seventeen and one-quarter pounds of pentene-2 were charged into still pot 10 and were boiled through column 12 by the application of steam to the jacket 11. Pure pentene-2 vapor, passed through pipe 14 into the reactor 15, condensed on the dephlegmator 16 and fell on the catalyst 17. The catalyst was two liters of granular Kleenflo activated clay. The pipe 18 carried the reacted liquid to the still pot 10. The column 12 and the dephlegmator 13 prevented the polymer that was formed from returning to the catalyst chamber. By adjusting the water flow to the dephlegmators and the steam to the still jacket, the temperature of the stream to the catalyst was kept at 130° C., and the flow of this stream was regulated at 158 pounds per hour. At the end of seven hours of such continuous operation, the polymer was withdrawn from the pot 10 and was found by distillation to contain 9.5 pounds of the dimer, 0.5 pound of an intermediate fraction and 2.3 pounds of the trimer and higher polymers. The yield of the dimer, based upon the pentene-2 consumed, was calculated to be 77%.

Various modifications are possible within the scope of the invention, and I do not therefore wish to be limited except by the scope of the following claim.

I claim:

A continuous process for the dimerization of propylene with the production of tetramethyl ethylene and involving recycling of unpolymerized propylene, comprising continuously vaporizing propylene from a liquid phase body of said propylene under conditions within 10° C. of but below the critical temperature of said proylene, fractionating the vapors thus produced to separate from said vapors material of higher boiling point than said propylene, thereafter condensing said propylene vapors, flowing the propylene condensate thus produced in a single pass through a bed of activated clay at a rate to maintain the contact time between 1 and 20 seconds and to restrict dimerization of said propylene to less than 10% of the propylene passing through said bed, and without further contact of the resulting mixture with said activated clay combining said mixture with said original body of propylene for revaporization and recycling of unpolymerized propylene while avoiding recontact of dimer product with said catalyst.

EUGENE V. KLEBER.

REFERENCES CITED

The following references are of record in the file of this patent:

UNITED STATES PATENTS

| Number | Name | Date |
| --- | --- | --- |
| 2,034,575 | Gray | Mar. 17, 1936 |
| 2,150,924 | Houdry | Mar. 21, 1939 |
| 2,151,374 | Cooke | Mar. 21, 1939 |
| 2,180,361 | Lassiat | Nov. 21, 1939 |
| 2,198,937 | Frey et al. | Apr. 30, 1940 |
| 2,273,038 | Houdry et al. | Feb. 17, 1942 |
| 2,318,719 | Schneider | May 11, 1943 |
| 2,329,714 | Grasshof | Sept. 21, 1943 |
| 2,365,426 | Molique | Dec. 19, 1944 |
| 2,380,358 | Anderson et al. | July 10, 1945 |

OTHER REFERENCES

Gayer, "The Cat. Poly. of Propylene"; Ind. and Eng. Chem., vol. 25, No. 10; Oct., 1933; pages 1122–1127.